United States Patent [19]
Okuda et al.

[11] Patent Number: 5,625,703
[45] Date of Patent: Apr. 29, 1997

[54] METHOD AND APPARATUS FOR DETECTING DEFECTIVE PRINTED MATTER PRINTING PRESS

[75] Inventors: Tetsuya Okuda; Shinichi Kojima, both of Ibaraki, Japan

[73] Assignee: Komori Corporation, Japan

[21] Appl. No.: 668,002

[22] Filed: Jun. 19, 1996

Related U.S. Application Data

[63] Continuation of Ser. No. 301,673, Sep. 4, 1994, abandoned, which is a continuation of Ser. No. 945,691, Sep. 16, 1992, abandoned.

[30] Foreign Application Priority Data

Sep. 18, 1991 [JP] Japan .................... 3-265548
Nov. 5, 1991 [JP] Japan .................... 3-315291

[51] Int. Cl.[6] ............................................ G06K 9/00
[52] U.S. Cl. ............................... 382/112; 348/130
[58] Field of Search ........................... 382/112, 141, 382/272, 135; 356/429, 430, 431; 348/88, 129, 130, 71

[56] References Cited

U.S. PATENT DOCUMENTS 4,311,914  1/1982  Huber ............................ 250/556
4,561,103 12/1985  Horiguchi et al. ................ 382/1
4,685,139  8/1987  Masuda et al. ................... 382/1
4,857,747  8/1989  Bolton et al. .................. 250/559
5,144,566  9/1992  Anderson et al. ............... 364/552

FOREIGN PATENT DOCUMENTS

0194331  3/1985  European Pat. Off. ........ B41F 33/00

Primary Examiner—Joseph Mancuso
Assistant Examiner—Gerard Del Rosso
Attorney, Agent, or Firm—Blakely Sokoloff Taylor & Zafman

[57] ABSTRACT

According to a method and apparatus for detecting a defective printed matter in a printing press, each pixel data of a printed matter serving as a reference is stored as reference image data. Each pixel data of a printed matter serving as a test object is input as test image data. Corresponding pixel data of the reference image data and the test image data are compared with each other to detect a defective printed matter. A change in tone is recognized by accumulating and comparing the reference image data and the test image data in units of predetermined areas. The reference image data is automatically updated and stored on the basis of new test image data upon recognition of the change in tone.

12 Claims, 3 Drawing Sheets

METHOD AND APPARATUS FOR DETECTING DEFECTIVE PRINTED MATTER PRINTING PRESS

This is a continuation of application Ser. No. 08/301,673 filed Sep. 4, 1994, now abandoned, which is a continuation of application Ser. No. 07/945,691 filed on Sep. 16, 1992 now abandoned.

BACKGROUND OF THE INVENTION

The present invention relates to an improvement of a method and apparatus for detecting a defective printed matter in a printing press by comparing reference image data with test image data, thereby detecting the defective printed matter.

In recent years, each pixel data (density data) of a printed matter serving as a reference is read and stored as reference image data by using an image processing means having an optical image pickup system, and then each pixel data of a test object is read as test image data by using the same image processing means as described above. The stored reference image data is compared with the test image data to automatically detect a defective printed matter.

The defective printed matter detecting apparatus for a printing press includes an image pickup means such as a CCD camera or a line sensor, a signal processor for processing an electrical signal as an output signal from the image pickup means, and a reference signal generating means for supplying a reference signal for processing to the signal processor. The level of pixel data (pixel position data) of the reference image data is compared with the level of the corresponding pixel data of the test image data to determine whether a difference between the levels of the reference and test image data falls within a predetermined range, thereby determining the defective or nondefective printed matter.

The printed matter serving as a reference for extracting the reference image data is a printed matter which is visually determined as a satisfactory printed matter selected from actual printed matters obtained in test printing at the start of printing.

According to the conventional defective printed matter detecting apparatus, when printing is to be performed in a large quantity and printing actually progresses, the tone of the printed matter is undesirably changed, and this change in tone is often detected to be defective for a further description of the meaning of "tone" as used in the art of printing, please see Ray Blair and Thomas M. Destree, *The Lithographer's Manual* (Graphic Arts Technical Foundation, Pittsburgh, Pa. 1988) at 11:9–11:19 and 14:22–14:24.

More specifically, in a printing press, printing conditions (e.g., the machine temperature and an ambient temperature) are changed, so that the machine temperature is low at the start of printing and is then increased in continuous printing. When printing progresses, the tone of the printed matter is changed. However, this change in tone does not fall outside a predetermined range and is small, a small change in tone of the printed matter can maintain product values of the printed matters. The printed matters can be circulated as a satisfactory product.

In the conventional defective printed matter detecting apparatus, since the reference image data input at the start of printing is permanent data, a difference between the levels of the reference image data and the test image data is increased while printing progresses. Although the resultant printed matters can be circulated as the satisfactory products, they are undesirably detected as defective printed matters, resulting in inconvenience.

SUMMARY OF THE INVENTION

It is an object of the present invention to provide a method and apparatus for detecting a defective printed matter in a printing press, wherein a change in tone caused by a change in printing conditions is not determined as a defective printed matter.

It is another object of the present invention to provide a method and apparatus for detecting a defective printed matter in a printing press, wherein a change in tone to a degree that a printed matter can be satisfactorily circulated as a product is not determined as a defective printed matter.

It is still another object of the present invention to provide a method and apparatus for detecting a defective printed matter in a printing press, wherein reference image data can be immediately input again to update the reference image data.

In order to achieve the above objects according to an aspect of the present invention, there is provided a method of detecting a defective printed matter in a printing press, comprising the steps of storing each pixel data of a printed matter serving as a reference as reference image data, inputting each pixel data of a printed matter serving as a test object as test image data, comparing corresponding pixel data of the reference image data and the test image data to detect a defective printed matter, recognizing a change in tone by accumulating and comparing the reference image data and the test image data in units of predetermined areas, and automatically updating and storing the reference image data on the basis of new test image data upon recognition of the change in tone.

In order to achieve the above objects according to another aspect of the present invention, there is provided an apparatus of detecting a defective printed matter in a printing press, comprising reference data memory means for storing each pixel data of a printed matter serving as a reference as reference image data, test data inputting means for inputting each pixel data of a printed matter serving as a test object as test image data, defective printed matter detecting means for comparing corresponding pixel data of the reference image data and the test image data to detect a defective printed matter, tone change recognizing means for recognizing a change in tone by accumulating and comparing the reference image data and the test image data in units of predetermined areas, and reference data re-input means for automatically updating and storing the reference image data on the basis of new test image data upon recognition of the change in tone by the tone change recognizing means.

DESCRIPTION OF THE PREFERRED EMBODIMENTS

Preferred embodiments of the present invention will be described in detail with reference to the accompanying drawings.

Figure 1:
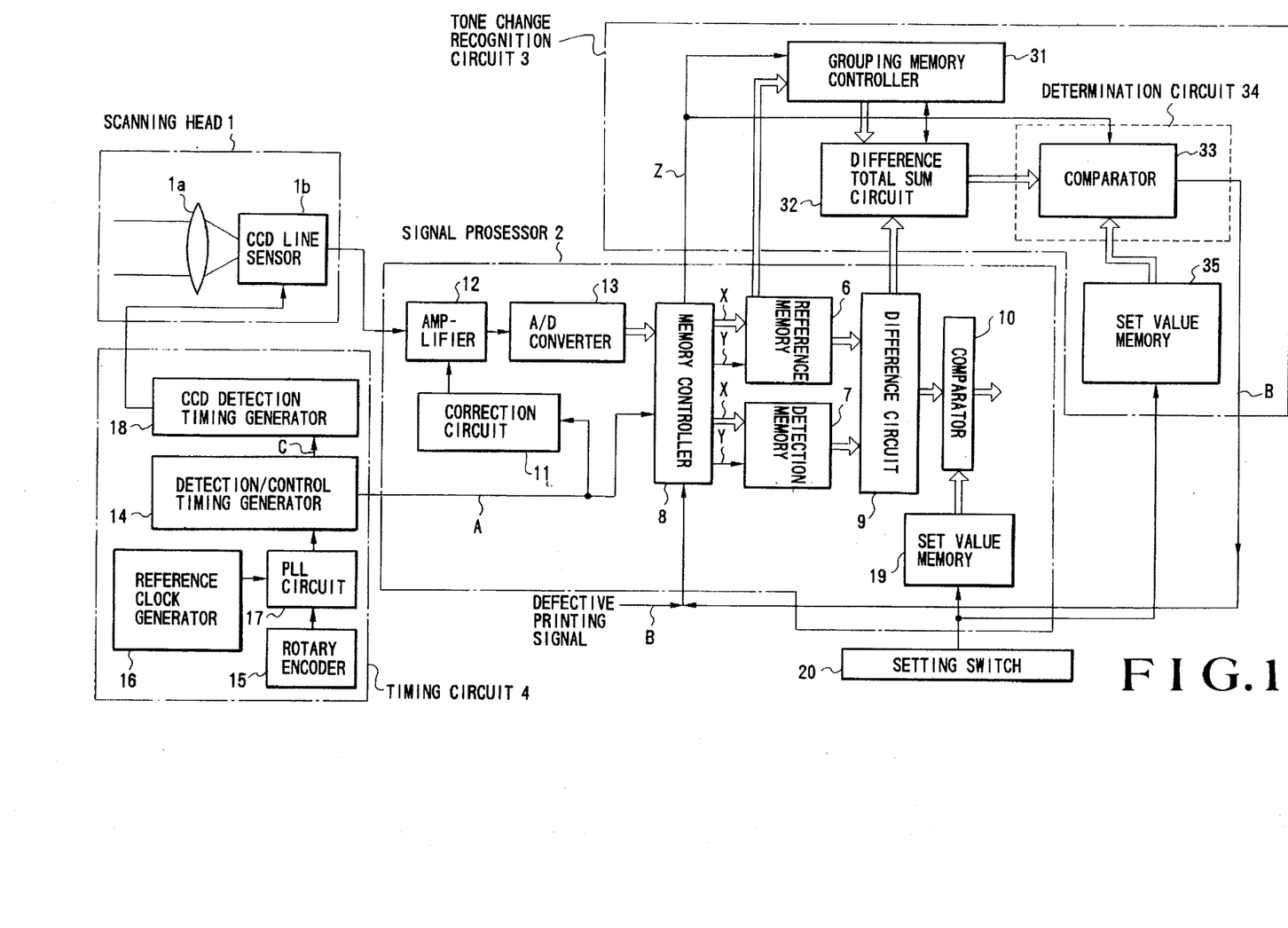
FIG. 1 is a block diagram of a defective printed matter detecting apparatus for a printing press according to an embodiment of the present invention.

FIG. 1 shows a defective printed matter detecting apparatus for a printing press according to an embodiment of the present invention. A scanning head 1 serving as an image pickup means comprises an optical system such as a lens 1a and a CCD line sensor 1b for converting an image focused through the optical system into an electrical signal. The scanning head 1 can pick up the resultant printed matter as an image.

A signal processor 2 comprises a reference memory 6 for storing input reference image data, a detection memory 7 for storing input test image data, a memory controller 8 for controlling read access and write access of the reference memory 6 and the detection memory 7, a difference circuit 9 for calculating a difference between pixel data read out from the reference memory 6 and the detection memory 7, a comparator 10 for comparing an output from the difference circuit 9 with a set value, a correction circuit 11 for correcting the output level of an amplifier, an amplifier 12 for amplifying an output from the CCD line sensor 1b in the scanning head 1, an A/D converter 13 for receiving an output from the amplifier 12 and outputting digital data to the memory controller 8 upon A/D conversion, and a set value memory 19 for outputting a value set by a setting switch 20 to the comparator 10. Reference symbol X denotes pixel data; and Y, a step signal including a pixel address.

The signal processor 2 is controlled by an external control timing signal A and a reference value memory signal B. More specifically, the control timing signal A comprises a reference signal as a pulse signal rising every rotation of a plate cylinder in a printing press (not shown) and a clock pulse as a read/write pulse signal rising every rotation of the plate cylinder. The control timing signal A is output from a detection/control timing generator 14 and is supplied to the memory controller 8 and the correction circuit 11 in the signal processor 2. On the other hand, the reference value memory signal B is supplied upon a turn-on operation of a switch (not shown) or supplied from a tone change recognition circuit 3 (to be described above) to the memory controller 8 in the signal processor 2.

The detection/control timing generator 14 comprises an up/down counter. The intervals of a detection timing signal C and the control timing signal A as output signals from the detection/control timing generator 14 are changed in accordance with a printing press speed detected by a rotary encoder 15 serving as a rotation detecting means. A PLL circuit 17 compares a reference clock pulse output from a reference clock generator 16 with the pulse signal representing the speed output from the rotary encoder 15 to control the detection/control timing generator 14 so as to output the detection timing signal C and the control timing signal A, both of which correspond to the printing press speed. Reference numeral 18 denotes a CCD detection timing generator for controlling the CCD line sensor 1b every rotation of the plate cylinder upon reception of the detection timing signal C so as to cause the signal processor 2 to receive a video signal. The detection/control timing generator 14, the rotary encoder 15, the reference clock generator 16, the PLL circuit 17, and the CCD detection timing generator 18 constitutes a timing circuit 4.

In this embodiment, read access of the video signal from the CCD line sensor 1b and signal processing timings in the signal processor 2 are changed so as to follow the printing press speed (rotational speed of the plate cylinder) detected by the rotary encoder 15.

The tone change recognition circuit 3 comprises a grouping memory controller 31 for receiving reference pixel data output from the reference memory 6, a difference total sum circuit 32 for receiving outputs from the grouping memory controller 31 and the difference circuit 9, a determination circuit 34 having a comparator 33 for receiving an output from the difference total sum circuit 32 and set value data, and a set value memory 35 for outputting set value data set by the setting circuit 20 to the comparator 33. The comparator 33 in the tone change recognition circuit 3 outputs the reference value memory signal B representing switching of the reference image data. The operations of the grouping memory controller 31 and the comparator 33 are controlled by the memory controller 8.

An operation of the defective printed matter detecting apparatus having the above arrangement will be described below.

At the start of printing, states of actual printed matters are visually checked while test printing is being performed. If the printed matters are determined to be satisfactory, a switch (not shown) is turned on to output the reference value memory signal B. Thereafter, when the detection timing signal C and the control timing signal A which represent a reference position are output from the detection/control timing generator 14, the CCD line sensor 1b is driven in accordance with an output from the CCD detection timing generator 18, thereby performing read access of the reference memory 6 for the reference image data from the printed matter serving as the reference. This read access is performed in accordance with the control timing signal A output from the detection/control timing generator 14 controlled by a clock pulse from the rotary encoder 15.

The reference image data read from the CCD line sensor 1b is stored in the reference memory 6 through the amplifier 12, the A/D converter 13, and the memory controller 8. After the reference image data is stored in the reference memory 6, test image data of the printed matter serving as a detection object is read during rotation of the plate cylinder upon progress of the printed matter. The read test image data is stored in the detection memory 7 selected by the memory controller 8.

The difference circuit 9 calculates a level difference between the corresponding pixel data of the reference image data output from the reference memory 6 and the test image data output from the detection memory 7. Data representing the level difference is output to the comparator 10. The comparator 10 compares the level difference input from the difference circuit 9 with a predetermined value stored in the set value memory 19. If the level difference is larger than the predetermined value, the comparator 10 outputs a comparison output representing a defective printed matter. In this case, if even one pixel having a level difference larger than the predetermined value is present, the defective printed matter may be determined. Alternatively, if a predetermined number of pixels having level differences each larger than the predetermined value are present, the defective printed matter may be determined.

An automatic re-input operation (additional function) performed simultaneously with the defective printed matter detecting operation (basic function) will be described with reference to the operation of the tone change recognition circuit 3.

Figure 5:
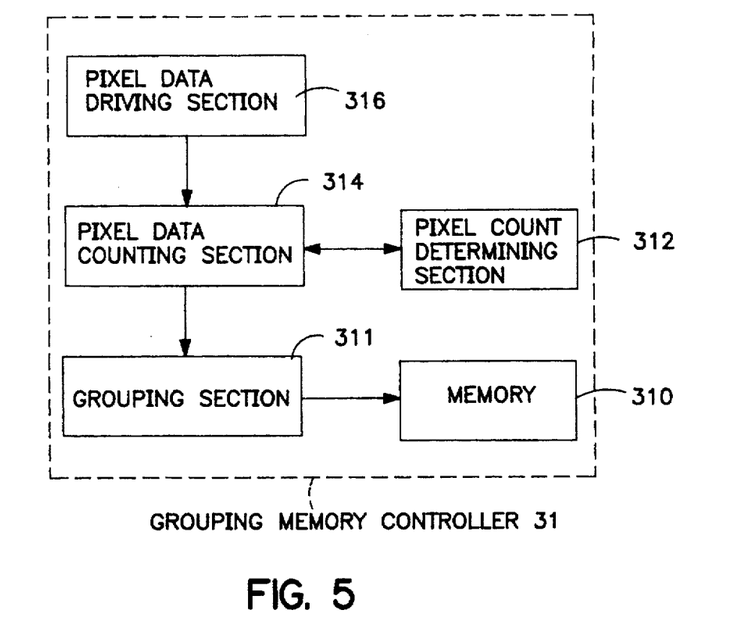
FIG. 5 is a diagram showing how the grouping memory controller operates.

When the switch is turned on to supply the reference value memory signal B to the memory controller 8, a signal Z representing this is received by the memory controller 8, and the grouping memory controller 31 classifies pixel data of the reference image data into a plurality of groups in accordance with the following procedures. Referring to FIG. 5, the grouping memory controller 31 performs the following steps:

a) The reference image data stored in the reference memory 6 is fetched, and image data of intermediate level except for high level (white portion) and low level (solid portion) are classified into 16 blocks divided in a direction parallel to the printing direction of the printing press.

b) The number of pixels of intermediate level is counted by a pixel data counting section 314 in units of blocks made by the pixel data dividing section 316.

c) If the number of pixels of intermediate level in a given block is less than 100, a block next to the given block is combined to the given block, and the number of pixels of the composite block is counted. A pixel count determining section 312 makes the determination of whether the number of pixels of intermediate level is less than 100 and then gives instructions to the pixel data counting section 314 to also count the number of pixels in an adjacent bock if the number of pixels of intermediate level in the given block was less than 100.

d) The pixel count data of intermediate level are grouped in units of single and composite blocks. In accordance with the results of the pixel data counting section 314, this grouping is achieved by a grouping section 311. The output of a grouping section 311 is then passed on by number and address of the pixels of intermediate level in each group to be stored by a memory 310.

In procedure c), by combining the given block and the block next to the given block when the number of pixels of intermediate level in the given block is less than 100, the number of pixels of intermediate block within one group is assured to be 100 or more, and erroneous determination of tone change recognition can be prevented.

When the number of pixels of intermediate level is not 100 or more in a combination of all the blocks, the following operation is not performed.

On completion of the grouping operation mentioned above, the numbers of pixels in the intermediate level and the pixel position (address) thereof are stored in the memory allocated for blocks in units of groups determined at the steps (c) and (d). The grouping memory controller 31 performs the above grouping and at the same time stores the number of pixels of intermediate level and pixel positions (addresses) thereof in units of groups.

Figure 6:
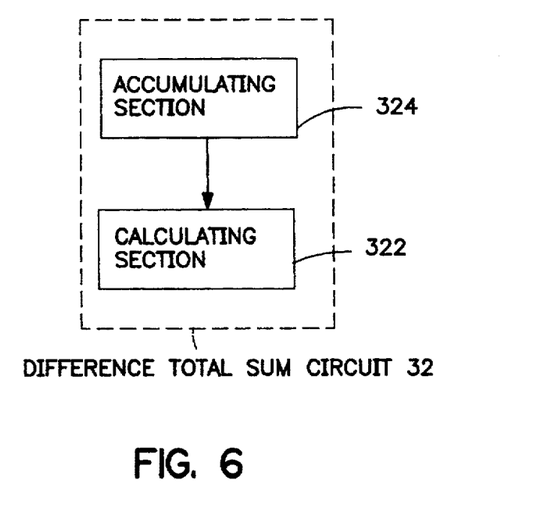
FIG. 6 is a diagram showing how the difference total sum circuit operates.

At the end of grouping in the grouping memory controller 31, the operation of the difference total sum circuit 32 is started and operates as shown in FIG. 6. The difference total sum circuit 32 receives, as difference data, the level differences between the corresponding pixel data of the reference image data and the test image data, which differences are output from the difference circuit 9 as shown in FIG. 1. Referring to FIG. 1, the difference total sum circuit 32 using an accumulating section 324 accumulates the absolute values of the difference data of intermediate level in units of groups in accordance with the pixel positions (or pixel addresses) of the reference image data stored in the grouping memory controller 31, which is divided into those various groups. The accumulation value is divided by the number of pixels of intermediate level stored in units of groups. The calculating section 322 as shown in FIG. 6 performs this division. That is, the following calculation represented by formula (1) below is performed in units of groups:

$$\text{(Total Sum of Absolute Values of Differences of Intermediate Level)}/\text{(Number of Pixels of Intermediate Level)} \quad (1)$$

When the calculation of each group by formula (1) is completed, the difference total sum circuit 32 receives a signal from the grouping memory controller 31 and supplies a calculation result as group average data to the comparator 33. The comparator 33 compares the group average data from the difference total sum circuit 32 with the predetermined value stored in the set value memory 35. If the group average data is larger than the predetermined value, a change in tone is recognized, and the reference value memory signal B is generated. However, when the group average value does not exceed the predetermined value, the calculation of the average value of the next group is started in the difference total sum circuit 32.

Formula (2) may be employed in place of formula (1), and a calculation result may serve as group average data. In this case, when the group average data is a predetermined value (negative) or less, or a predetermined value (positive) or more, the change in tone is detected to generate the reference value memory signal B.

$$\text{(Total Sum of Difference Data of Intermediate Level)}/\text{((Number of Pixels of Intermediate Level 1)} \quad (2)$$

The reference value memory signal B from the comparator 33 is supplied to the memory controller 8 in the same manner as the case wherein the switch is turned on to supply the signal, thereby updating and storing the next test image data as reference image data in the reference memory 6. At the same time, the updated reference image data are newly grouped in the grouping memory controller 31.

When the tone of the printed matter is slightly changed with a change in printing conditions, a defective printed matter detecting operation is performed on the basis of the updated and stored reference image data during printing.

In this embodiment, the determination circuit 34 updates the reference image data when even one of the group average data exceeds the predetermined value in the comparison result from the comparator 33. However, the reference image data may be updated on the basis of the number of groups whose group average data exceed the predetermined value.

In this embodiment, when the tone change recognition circuit 3 generates a reference value memory signal, the test image data to be obtained next is updated and stored as the reference image data in the reference memory 6. However, the test image data already stored in the detection memory 7 may be updated and stored as reference image data under the control of the memory controller 8.

Figure 2:
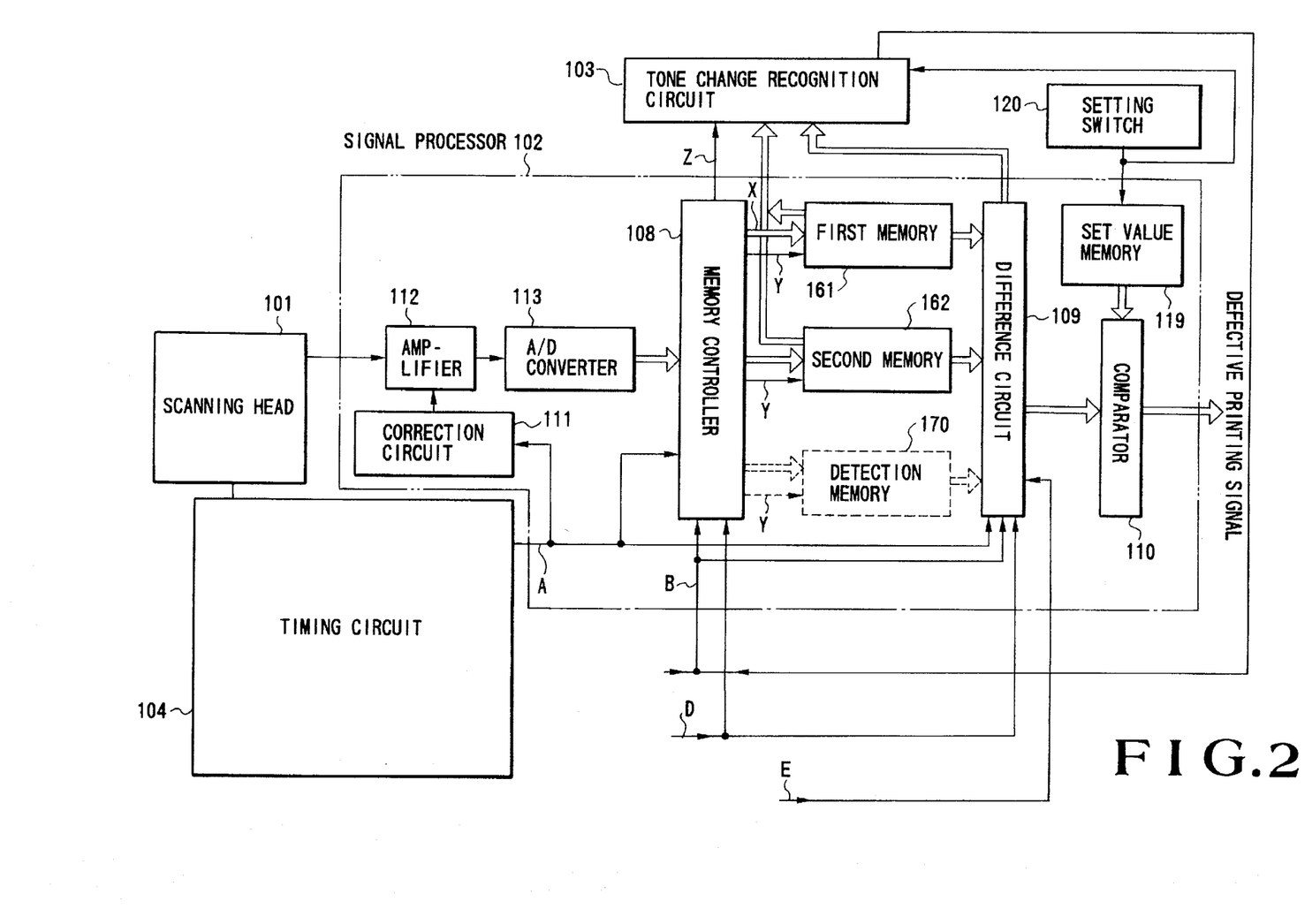
FIG. 2 is a block diagram of a defective printed matter detecting apparatus for a printing press according to another embodiment of the present invention.

FIG. 2 is a block diagram of a defective printed matter detecting apparatus for a printing press according to another embodiment of the present invention. In the defective printed matter detecting apparatus shown in FIG. 2, in place of the reference memory 6 and the detection memory 7 in FIG. 1, a signal processor 102 comprises first and second memories 161 and 162 for alternately switching the functions of the reference and detection memories. Other arrangements of a scanning head 101, a tone change recognition circuit 103, a timing circuit 104, and the signal processor 102 are the same as those in FIG. 1, and a detailed description thereof will be omitted. A detection/control timing generator 114, a rotary encoder 115, a reference clock generator 116, a PLL circuit 117, and a CCD detection timing generator 118 act in a similar manner to their counterparts in FIG. 1 and a detailed description thereof will be omitted. Reference symbol D denotes a determination start signal; and E, a determination precision operation signal for adjusting the precision of a difference circuit 109.

Figure 3A:
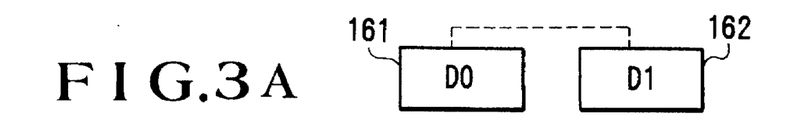
FIGS. 3A to 3C are views showing states of image data input to first and second memories shown in FIG. 2.

An operation of the apparatus having the above arrangement will be described below. At the start of printing, states of actual printed matters are visually checked while test printing is being performed. If the printed matters are determined to be nondefective, a switch (not shown) is turned on to generate a reference value memory signal B. Thereafter, when the detection timing signal C and the control timing signal A which represent a reference position are output from the detection/control timing generator 114, the reference image data from the printed matter serving as the reference is written in the first memory 161 (FIG. 3A).

After reference image data $D_0$ is stored in the first memory 161, a memory controller 108 writes first test image data $D_1$ of the printed matter as a detection object upon rotation of the plate cylinder.

The difference circuit 109 calculates a level difference between the corresponding pixel data of the reference image data $D_0$ stored in the first memory 161 with the test image data $D_1$ stored in the second memory 162. The level difference is output to a comparator 110. The comparator 110 compares the level difference data from the difference circuit 109 with a predetermined value stored in a set value memory 119. If the level difference data is larger than the predetermined value, a comparison output representing defective printing is generated.

Figure 3B:
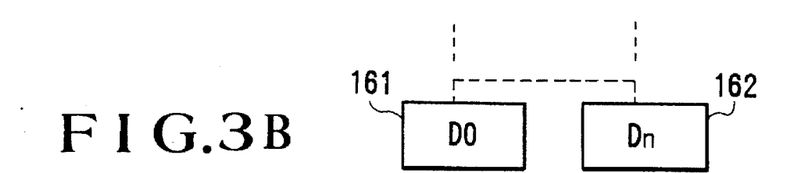

In the same manner as described above, test image data $D_n$ (where n is an integer and 0 represents the initial reference data and where 1, 2 . . . represent the first, second, . . . test data respectively) of the printed matter as the detection object which are sequentially obtained are updated and stored in the second memory 162 (FIG. 3B). The reference image data $D_0$ stored in the first memory 161 is compared with the test image data $D_n$ stored in the second memory 162 to detect a defective printed matter.

At the same time, grouping is performed in the tone change recognition circuit 103 on the basis of the reference image data $D_0$ stored in the first memory 161 in the same manner as in FIG. 1. When a change in tone which exceeds a predetermined value is recognized on the basis of the output from the difference circuit 109 in units of groups, the reference value memory signal B is supplied from the tone change recognition circuit 3 to the memory controller 108 and the difference circuit 109.

Figure 3C:
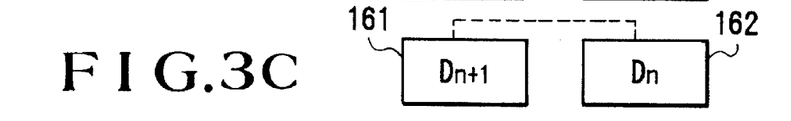

The memory controller 108 receives this reference value memory signal B as a switching command. Next test image data $D_{n+1}$ is switched and stored in the first memory 161, and the test image data $D_n$ in the second memory 162 is left as the test image data $D_n$ (FIG. 3C). That is, the first memory is switched as a test image memory, and the second memory is switched as a reference image memory. The difference circuit 109 receives the reference value memory signal as the switching command. The difference circuit 109 calculates a level difference between the corresponding pixel data of the reference image data $D_n$ left in the second memory 162 and the test image data $D_{n+1}$ to be updated and stored in the first memory 161. The resultant level difference data is output to the comparator 110. The comparator 110 compares the level difference data from the difference circuit 109 with the predetermined value stored in the set value memory 119. If the level difference is larger than the predetermined value, a comparison output representing defective printing is generated.

In the same manner as described above, the test image data of the printed matter of the test object to be obtained is updated and stored in the first memory 161, and the reference image data $D_n$ stored in the second memory 162 is compared with the test image data stored in the second memory 162 to detect the defective printed matter.

In the above embodiment, when the reference image data $D_0$ is stored in the first memory 161, this reference image data $D_0$ is compared with the test image data updated and stored in the second memory 162. However, test image data may be directly supplied to the second memory 161 and then the difference circuit 109. The input test image data may be compared with the reference image data $D_0$.

As indicated by a broken line in FIG. 2, another detection memory 170 may be arranged, and test image data may be updated and stored in the detection memory 170. The test image data stored in the detection memory 170 may be compared with the reference image data stored in the first or second memory 161 or 162.

Figure 4A:
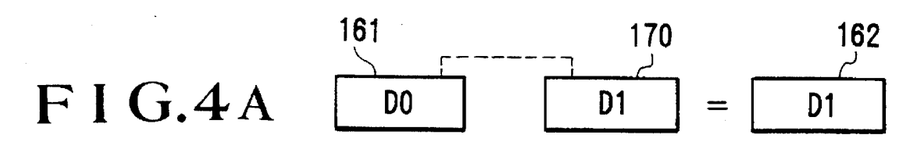
FIGS. 4A to 4C are views showing states of test data input to the first and second memories and a detection memory shown in FIG. 2.
Figure 4B:
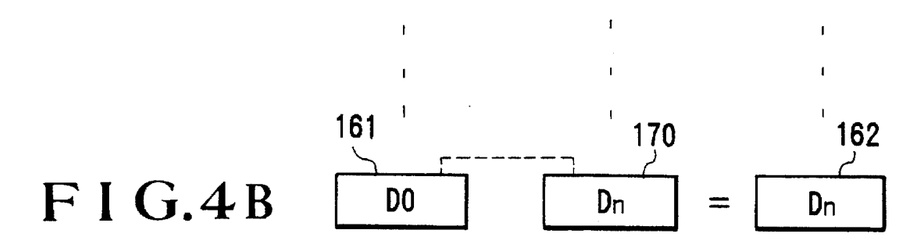
Figure 4C:
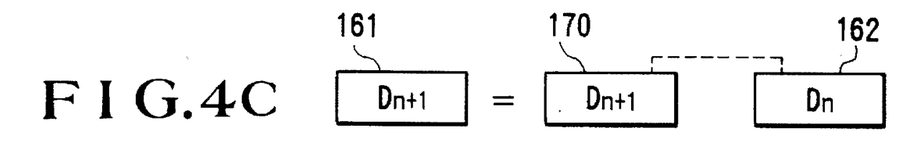

More specifically, as shown in FIGS. 4A and 4B, the reference image data $D_0$ is stored in the first memory 161, the test image data $D_1$ to $D_n$ are updated and stored in the second memory 162 and the detection memory 170 upon rotation of the plate cylinder, and the reference image data $D_0$ stored in the first memory 161 is compared with the test image data $D_1$ (. . . $D_n$) stored in the detection memory 170, thereby detecting a defective printed matter. Upon reception of a switching command on the basis of the reference image data $D_0$ and the test image data $D_n$, the test image data $D_n$ stored in the second memory 162 is changed to reference image data, as shown in FIG. 4C. Data from the test image data $D_{n+1}$ are switched and stored in the first memory 161 and the detection memory 170. The reference image data $D_n$ stored in the second memory 162 is compared with the test image data stored in the detection memory 170 to detect a defective printed matter.

According to this embodiment, detection of a defective printed matter which is disabled until reference image data is input to the reference memory 6 again can be performed, and new reference image data can be immediately prepared when reference data switching is required.

As has been described above, according to the present invention, a change in tone of a printed matter is recognized to automatically update and store reference image data during printing. A slight change in tone which is caused by a change in printing conditions so as to allow a resultant printed matter as the printed matter circulated as a satisfactory product is determined not to result in a defective printed matter. In addition, when reference image data is immediately input again, defective printed matter detection of all the printed matters as target objects can be performed.

What is claimed is:

1. A method of detecting a defective printed matter in a printing press, comprising the steps of:

storing all pixel data of a printed matter serving as a reference as reference image data:

inputting each pixel data of a printed matter serving as a test object as test image data;

respectively comparing the test image data with the reference image data on the basis of addresses of the pixel data of the reference to detect a defective printed matter;

grouping a plurality of pixel data of intermediate level existing between predetermined high and low levels of the reference image data into groups of predetermined areas, the high and low levels respectively corresponding to a substantially white portion Of the printed matter serving as the reference and a substantially solid portion of the printed matter serving as the reference, the predetermined areas being obtained by dividing the printed matter serving as the reference in a direction parallel to the direction of printing in the printing press, said grouping to exclude all pixels except those of intermediate level, wherein the stem of grouping includes the step of obtaining the group by dividing an entire portion of the printed matter serving as the reference into predetermined shapes, and combining adjacent predetermined shapes in the entire portion with one another in turn to make one group of predetermined areas, said combining to continue until the combined number of pixels of intermediate level in the group reaches a predetermined number;

calculating differences between the reference image data and the test image data designated only by the addresses of the pixel data of intermediate level;

accumulating absolute values of the differences calculated and dividing the accumulated absolute values by the number of the pixel data of intermediate level in units of the groups of the predetermined areas to respectively obtain group average values; and recognizing a change in tone of the printed matter which occurs based on changes in printing condition as the test object when at least one of the group average values is not less than a predetermined value; and newly storing the test image data upon recognition of the change in tone as the reference image data in order to automatically update the reference image data.

2. A method according to claim 1, wherein the step of inputting the pixel data comprises the step of storing all the test image data of the printed matter serving as the test object, thereby comparing all the reference image data stored and all the test image data stored.

3. A method according to claim 2, further comprising a step of selectively storing the reference image data using a first memory means and a second memory means, wherein the step of newly storing the test image data comprises a step of changing the test image data stored in one of said first and second memory means to the reference image data upon recognition of the change in tone, and the step of storing all of the test image data comprises a step of storing the test image data in the other one of said first and second memory means, thereby detecting the defective printed matter on the basis of the reference image data alternately stored in said first and second memory means.

4. A method according to claim 3, further comprising a step for always storing the test image data using a third memory means, wherein the step of respectively comparing the test image data with the reference image data comprises a step of comparing the reference image data stored in one of said first and second memory means with the test image data stored in said third memory means.

5. A method according to claim 1, wherein the step of grouping the pixel data of intermediate level comprises a step of newly grouping the test image data stored as reference image data for the purpose of updating the reference image data.

6. A method according to claim 1, wherein the step of recognizing the change in tone comprises the step of recognizing a change in tone when a number of groups each having a group average value exceeding the predetermined value is not less than a predetermined number.

7. An apparatus for detecting a defective printed matter in a printing press, comprising:

reference data memory means for storing all pixel data of a printed matter serving as a reference as reference image data;

test data inputting means for inputting each pixel data of a printed matter serving as a test object as test image data;

defective printed matter detecting means for respectively comparing the test image data with the reference image data on the basis of addresses of the pixel data of the reference to detect a defective printed matter;

grouping means for grouping a plurality of pixel data of intermediate level existing between predetermined high and low levels of the reference image data into groups of predetermined areas the high and low levels respectively corresponding to a substantially white portion of the printed matter serving as the reference and a substantially solid portion of the printed matter serving as the reference, the predetermined areas being obtained by dividing the printed matter serving as the reference in a direction parallel to the direction of printing in the printing press, said grouping to exclude all pixels except those of intermediate level, wherein the groups of predetermined areas are obtained by dividing an entire portion of the printed matter serving as the reference into predetermined shapes, and combining adjacent predetermined shapes in the entire portion with one another in turn to make one group of predetermined areas, said combining to continue until the combined number of pixels of intermediate level in the group reaches a predetermined number;

difference calculating means for calculating differences between the reference image data and the test image data designated only by the addresses of the pixel data of intermediate level;

group average value calculating means for accumulating absolute values of the differences calculated, and dividing accumulated absolute values by the number Of the pixel data of intermediate level in units of groups of predetermined areas obtained by said grouping means of the predetermined areas to respectively obtain values; and recognizing means for recognizing the change in one which occurs based on changes in printing condition of the printed matter as the test object when at least one of the group average values calculated by said group average value calculating means is not less than a predetermined value; and reference data re-input means for storing the test image data upon recognition of the change in tone by said tone change recognizing means as the reference image data in order to automatically update the reference image data.

8. An apparatus according to claim 7, wherein said test data inputting means comprises test data memory means for storing all the test image data of the printed matter serving as the test object therein, wherein said defective printed matter detecting means compares all the reference image data stored in said reference data memory means and all the test image data stored in said test data memory means.

9. An apparatus according to claim 7, wherein said grouping means newly groups updated and stored reference image data.

10. An apparatus according to claim 7, wherein said tone change recognizing means recognizes a change in tone when a number of groups each having a group average value exceeding the predetermined value is not less than a predetermined number.

11. An apparatus according to claim 7, wherein the reference data memory means comprises first memory means and second memory means and the test image data stored in one of the first and the second memory means is changed to reference image data and subsequent test image data is updated and stored in the other of the first and second memory means upon recognition of the change in tone, thereby detecting the defective printed matter on the basis of the reference image data alternately stored in said first and second memory means.

12. An apparatus according to claim 11, further comprising third memory means for always updating and storing test image data, so that the defective printed matter is detected on the basis of the reference image data stored in one of said first and second memory means and test image data stored in said third memory means.

* * * * *

UNITED STATES PATENT AND TRADEMARK OFFICE
CERTIFICATE OF CORRECTION

PATENT NO. : 5,625,703
DATED : April 29, 1997
INVENTOR(S) : Okuda et al.

It is certified that error appears in the above-identified patent and that said Letters Patent is hereby corrected as shown below:

Please delete FIG. 2 of the drawing sheets and insert attached FIG. 2.

Please insert drawing sheets of FIG. 5 and FIG. 6.

In the Drawing Sheets, please delete "Sheet 1 of 3", "Sheet 2 of 3", and "Sheet 3 of 3 ", and insert -- Sheet 1 of 4 --, -- Sheet 2 of 4 --, and -- Sheet 3 of 4 --.

In column 5 after line 15, please insert -- The "intermediate level" refers to the halftone portion of the image. This classification is performed by a pixel data dividing section 316. --

In column 5 at line 24, please delete " bock " and insert -- block --.

In column 8 at line 65 and column 10, claim 7 at line 35, please delete " Of " and insert -- of --.

In column 10, claim 7 at line 40, please delete " one " and insert -- tone --.

Signed and Sealed this

Sixteenth Day of December, 1997

*Attest:*

BRUCE LEHMAN

*Attesting Officer*        Commissioner of Patents and Trademarks